United States Patent [19]

Molen et al.

[11] 4,381,027

[45] Apr. 26, 1983

[54] TIRE INFLATION SAFETY CAGE

[76] Inventors: James O. Molen, 189 Conners Ave., Chico, Calif. 95926; Stephen C. Molen, 1215 East St., Orland, Calif. 95963

[21] Appl. No.: 198,207

[22] Filed: Oct. 17, 1980

[51] Int. Cl.³ .............................................. B60C 25/00
[52] U.S. Cl. ........................................................ 157/1
[58] Field of Search .................. 157/1, 1.1, 1.17, 1.26, 157/1.28, 13

[56] References Cited

U.S. PATENT DOCUMENTS

| | | | |
|---|---|---|---|
| 2,784,776 | 3/1957 | Wentzien et al. | 157/1 |
| 2,792,056 | 5/1957 | Ricketts et al. | 157/1 |
| 3,213,916 | 10/1965 | Oliver | 157/1.28 |
| 3,630,260 | 12/1971 | Bailey | 157/1.26 |
| 3,851,695 | 12/1974 | Kimberly | 157/1.1 |
| 3,937,264 | 2/1976 | Mikovits et al. | 157/1.1 |

*Primary Examiner*—James G. Smith

[57] ABSTRACT

A tire inflation safety cage for a tire having a lock ring which includes a framework mounted on a base plate with longitudinally extending side members forming an enclosure having an open end with an open area above the side members for connecting an air hose to the valve of a tire on a wheel to be inflated disposed within the interior with a foot pedal actuated valve within the hose, the side members being supported in spaced-apart, substantially parallel relationship to permit a hammer to be laterally swung by an operator into striking engagement with a selected portion of the lock ring for positive seating on the wheel together with a pair of spaced-apart, parallel rollers, having an elevating mechanism therebetween and a ramp associated therewith so that a tire on a wheel may be moved through the framework open end and rotatably positioned on the rollers for rotation into a selected rotary position for inflation and seating of the lock ring following which the inflated tire may be easily removed from the framework by manual actuation of the elevating mechanism.

20 Claims, 8 Drawing Figures

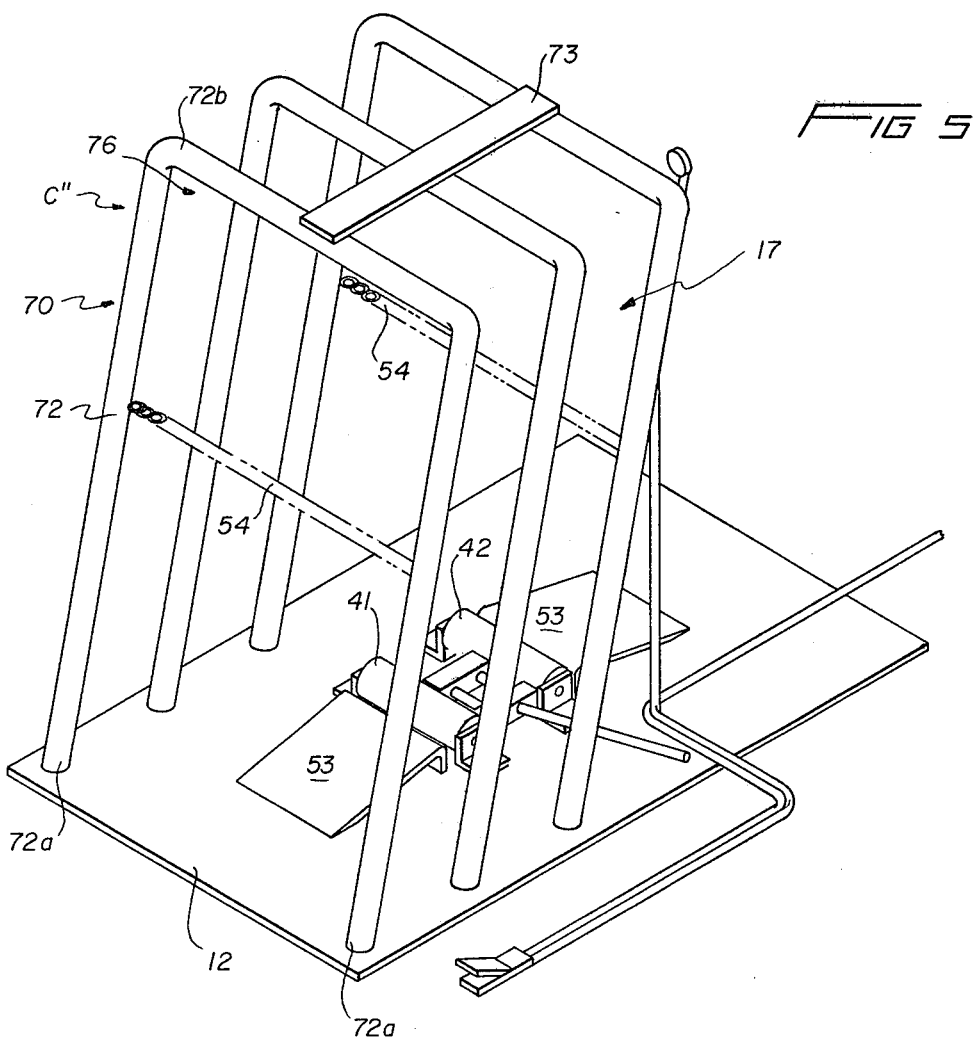
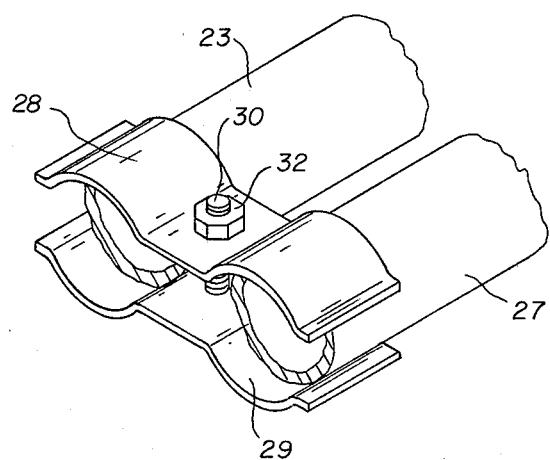

TIRE INFLATION SAFETY CAGE

BACKGROUND OF THE INVENTION

Conventional tires in use today of relatively large size installed on small trucks and larger vehicles such as tractor-trailers, earth moving equipment and the like utilize a construction unlike those found in ordinary passenger vehicles. Such large tires particularly those of the tube type are installed on a wheel provided with a side ring and a lock ring which may be either of the split lock ring type or of a two piece construction. Such lock rings serve to securely retain the tire on the wheel. As all such large tube type tires must be repaired from time to time due to flats and the like, the common procedure is to deflate the tire, remove the tire side ring and lock ring from the wheel following which the tire is repaired. When repair has been completed, it is, of course, necessary to replace the tire in the deflated condition on the wheel together with the side ring and lock ring, the lock ring being the last part installed and positively seated on the wheel as carefully as possible. In the last step, the tire is inflated or "aired" and under present day requirements, which have become virtually mandatory, the tire to be inflated must be placed in a "safety cage" during the inflation operation.

The use of such a safety cage is required as during the inflation operation wherein pressures may reach 60 to 120 psi, it is not uncommon for the lock ring to be only partially seated with the result that as the inflation proceeds, an explosion of the tire and wheel parts may occur so that the parts are propelled at high velocity with resulting injury and even death to personnel in the area. To reduce the likelihood of such an explosion, the common practice is to strike portions of the lock ring which is not positively seated during the inflation operation with a hammer wielded by the operator who supposedly carefully observes the tire and lock ring during the inflation operation. Even with such meticulous attention to the tire and wheel during the inflation operation, it is still not uncommon for an explosion to occur and the propelled parts are retained within the cage avoiding injury to the operator.

Present day safety cages are characterized by many limitations. The common type of such safety cage is the "croquet hoop" type in which a plurality of vertically extending, hoop shaped members are arranged in side-by-side relationship on a base plate in which the tire and wheel are supported during the inflation operation. Such present day cage construction makes it extremely difficult for the operator to reach unseated portions of the lock ring since only vertical slots are provided by the hoop members making the swinging of the hammer by the operator extremely awkward. Furthermore, since the tire is connected by means of a hose to an associated source of pressurized air during the inflation operation, rotation of the tire for access to various unseated portions of the lock ring is difficult particularly when the tire must be rotated with the air hose connected thereto. Furthermore, not only is it difficult to properly support the tire within the safety cage but manual rotation of the tire is awkward and difficult.

OBJECTS AND SUMMARY OF THE INVENTION

Accordingly, a primary object of this invention is to provide a new and novel safety cage for the inflation of large tube type tires incorporating a lock ring.

Another object of this invention is to provide a new and novel safety cage for tire inflation which eliminates all possible injury to an operator from an exploding tire and wheel during the inflation operation.

A further object of this invention is to provide a new and novel safety cage for a tire on a wheel having a lock ring wherein the tire and wheel may be simply and easily moved into and out of the cage with a minimum of effort.

A still further object of this invention is to provide a new and novel safety cage for a tire on a wheel having a lock ring which permits the tire to be easily rotated to a selected rotary position wherein a hammer may be wielded by an operator for positively seating the lock ring during the inflation operation and in which the air hose may be easily connected to the tire for inflation without interference during the rotation of the tire.

A still further object of this invention is to provide a new and novel safety cage for a tire on a wheel having a lock ring which utilizes a foot actuated pedal for communicating the tire with an associated source of pressurized air leaving the operator's hands free for seating the lock ring.

Still another object of this invention is to provide a new and novel safety cage for the inflation of a tire on a wheel having a lock ring which is simple and inexpensive in construction wherein the tire inflation pressure may be easily regulated and limited to a maximum pressure and wherein a tire may be inflated in a minimum of time by a relatively unskilled operator while providing absolute safety from tire explosion to the operator.

Further objects and benefits will become evident when considering the following detailed specification when taken in conjunction with the appended drawing figures.

BRIEF DESCRIPTION OF THE DRAWINGS

FIG. 5 is a perspective view of a third embodiment of the safety cage of the invention;

FIG. 7 is a perspective view of a portion of the safety cage of the invention.

DESCRIPTION OF THE PREFERRED EMBODIMENTS

Figure 1:
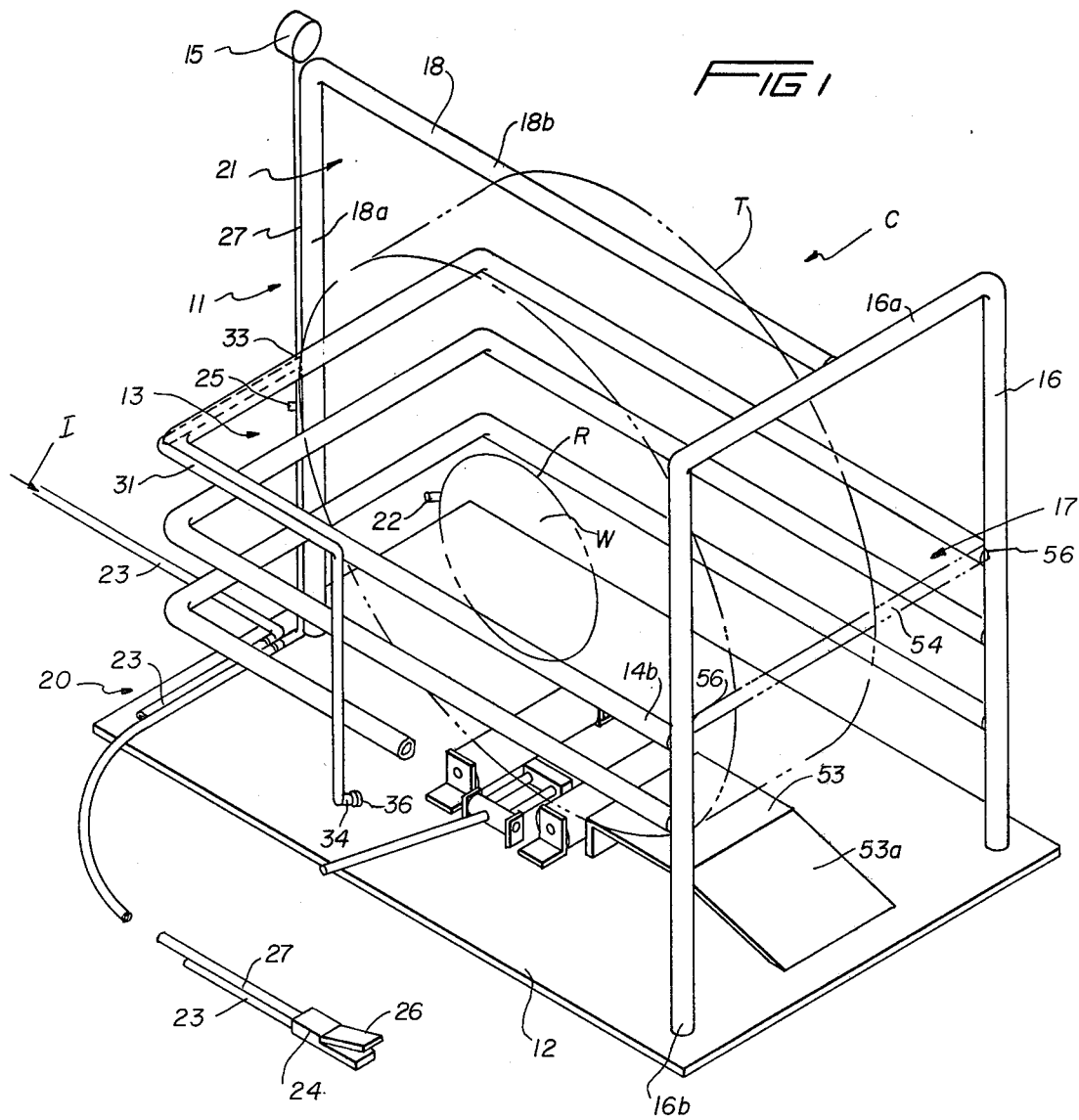
FIG. 1 is a perspective view of one embodiment of the safety cage of the invention.

Referring now to the drawings and to FIG. 1 in particular, there is shown a safety cage constructed in accordance with the invention and designated generally by the letter C. As will be explained hereinafter, the safety cage C is of the type for accommodating a tire T on a wheel W having a lock ring R of the well known type during inflation or "airing" of the tire T after a tire has been repaired. As is well known, the cage C is of the type for preventing injury to the operator during inflation of the tire T in the event the tire T and wheel W explode propelling parts outwardly, such propelled parts being contained by the cage.

The cage C comprises a framework designated generally by the reference numeral 11 which is suitably mounted on a base plate 12 which may be of any suitable planar material such as sheet metal or the like.

The framework 11 defines an enclosure having an interior 13 for accommodating the tire T to be inflated and the framework includes a plurality of longitudinally extending side members 14 which may be formed of pipe or the like and which are preferably of U-shaped configuration having bight portions 14a and free ends 14b. Means are provided for supporting the side members 14 in spaced-apart, substantially parallel relationship which, in the embodiment of FIG. 1, include a vertically extending frame member 16 having a bight portion 16a and free ends 16b suitably secured by welding or the like to the upper surface of the base plate 12. The free ends 14b of the side members 14 are suitably secured by welding or the like to the leg portions of the U-shaped frame member 16 which defines an open end 17 for the framework 11 through which the tire T passes as the tire is moved into and out of the enclosure interior 13.

In the embodiment of FIG. 1, the supporting means for the side members 14 also include an L-shaped frame member 18 having a vertical section 18a and a horizontally extending section 18b. The lower end of the vertical section 18a is suitably secured by welding or the like to the base plate 12 and the horizontally extending section 18b is suitably secured by welding or the like to the bight portion 16a of the U-shaped frame member 16. Thus, the frame member section 18b together with the bight portion 16a define the upper extremity of the framework 11 and the uppermost side member 14 defines therewith an open area 21 extending laterally on opposite sides of the framework 11 thus exposing an upper circumferential portion of a tire T disposed within the enclosure interior 13.

The safety cage C of FIG. 1 includes means adapted to extend through the open area 21 for connecting a tire valve 22 on the tire T with an associated source of pressurized air (not shown) as indicated by the arrow I. More specifically, conduit means 20 are provided which includes a first conduit section 23 connected to the associated source of pressurized air by any suitable means. The conduit section 23 has a portion extending along the upper surface of the base plate 12 and is connected at the opposite end to a normally closed, foot operated valve 24 having a foot pedal 26 which may be disposed adjacent the base plate 12 for the convenience of the operator.

The conduit means 20 includes a second conduit section 27 which is connected at one end to the foot operated valve 24 and which extends along the first section 23 as shown in FIG. 1 along the upper surface of the base plate 12 and vertically upward along the vertical extend section 18a of the L-shaped frame member 18.

In the preferred embodiment, the conduit sections 23, 27 are clamped to the upper surface of the base plate 12 adjacent the vertical section 18a by means of a pair of clamping members 28, 29 having a bolt 30 therebetween with the bottom end of the bolt 30 secured by welding or the like to the base plate 12 as shown best in FIG. 7. Thus, adjacent portions of the conduit sections or hoses 23, 27 are securely retained on the upper surface of the base plate 12 by clamping the members 28, 29 together using a nut 32 threaded on the bolt 30 so that the portions of the conduit means 20 extending outwardly from the base plate 12 to the source of pressurized air and the foot operated valve 24 may be moved freely. The conduit second section or hose 27 extends along the frame member vertical section 18a and preferably the conduit second section or hose 27 is provided with a fully rotational air pressure gauge 15 and a pop-off/air regulator 25 which limits the pressure of the air in conduit 27 to a predetermined maximum.

Figure 8:
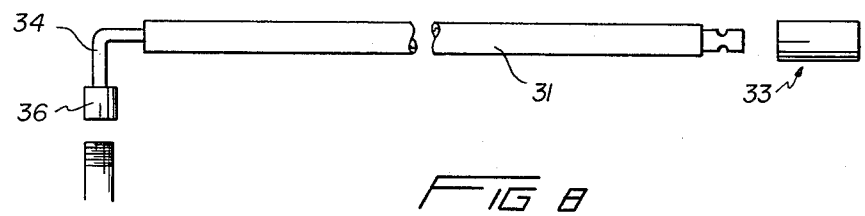
FIG. 8 is a perspective view of another portion of the safety cage of the invention.

The conduit means 20 includes a third section in the form of a hose 31 or the like which is connected at one end to the hose 27 by means of a swivel fitting 33 of any well known construction such as shown in detail in the detached relationship in FIG. 8. The opposite end of the hose 31 is provided with an elbow 34 on the outer end of which is provided a swivel air chuck 36 by means of which the hose 31 is connected to the tire valve 22 for inflating the tire T. The hose 31 is inserted within the enclosure interior 13 through the open area 21 and, as will be explained hereinafter, the tire T may be rotated axially to a selected rotary position during inflation without interference of the framework 11 with the hose 31.

Means are provided on the base plate 12 for supportingly engaging a bottom peripheral portion of the tire T within the enclosure interior 13 for manual rotation of the tire into a selected rotary position. Most specifically, a pair of transversely extending, freely rotatable rollers 41, 42 are mounted on the upper surface of the base plate 12 by suitable means such as brackets 43, 44 respectively, the rollers 41, 42 being arranged in spaced-apart, parallel relationship as shown best in FIG. 2. Thus, as shown in FIG. 1, the tire T is supported on the rollers 41, 42 and may be manually rotated simply and easily into any selected rotary position.

Figure 2:
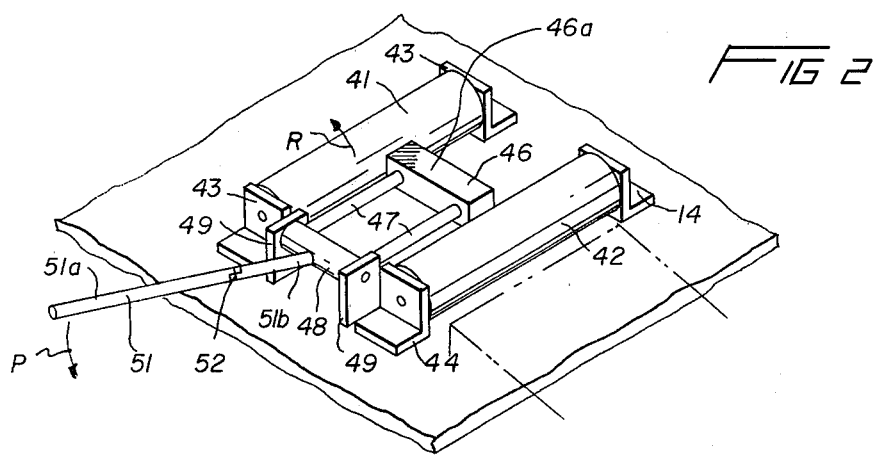
FIG. 2 is an enlarged perspective view of a portion of the cage in FIG. 1.

Means are also disposed on the base plate 12 between the rollers 41, 42 for lifting the tire T from the rollers for rolling movement of the tire T out of the enclosure interior 13 and through the framework open end 17. More specifically, such lifting means include a plate member 46 pivotally mounted for pivotally upward movement from a depressed position between the rollers 41, 42 as shown in FIG. 2 by means of rods 47, the other ends of the rods 47 being connected to a shaft 48 supported for rotation at opposite ends on a pair of spaced brackets 49. An operating lever 51 is connected at one end to the shaft 48 so that manual movement of the lever 51 downwardly in the direction of the arrow P moves the plate member 46 pivotally upward in the direction of the arrow R for engagement with the lower peripheral portion of the tire T to lift the tire vertically upward out of engagement with the rollers 41, 42.

It will be noted that in the preferred embodiment, the operating lever 51 includes an outer portion 51a pivotally connected at a joint 52 to the inner portion 51b of the lever 51 so that the lever portion 51a may be pivotally moved inwardly into a storage position so as to overlie the upper surface of the base plate 12. Also, it will be noted that the upper surface of the plate member 46 is inclined downwardly to the right as viewed in FIG. 2 to provide a slanted surface or incline 46a so that upon lifting of the tire T, the tire T is urged down the incline 46a towards the open end 17 of the framework 11. Also associated with the rollers 41, 42 is a ramp 53 suitably secured to the upper surface of the base plate 12, the ramp 53 having an inclined portion 53a disposed between the roller 42 and the framework open end 17. Thus, when the tire T begins to roll down the inclined surface 46a of the plate member 46, the tire rolls onto the ramp 53 and down the ramp portion 53a out of the framework open end 17.

In the embodiment of FIG. 1, the cage C includes a transversely extending, restraining member 54 which may be in the form of a chain, cable or a similar structural member which is removably connected to the leg portions of the U-shaped frame member 16 between the bight portion 16a and the base plate 12. The ends of the restraining member 54 may be connected to the frame member 16 by means such as hooks 56 so that in the event of an explosion of the tire T and wheel W during inflation, the parts propelled by the force of the explosion are contained within the enclosure interior 13 and do not pass through the open end 17.

Figure 3:
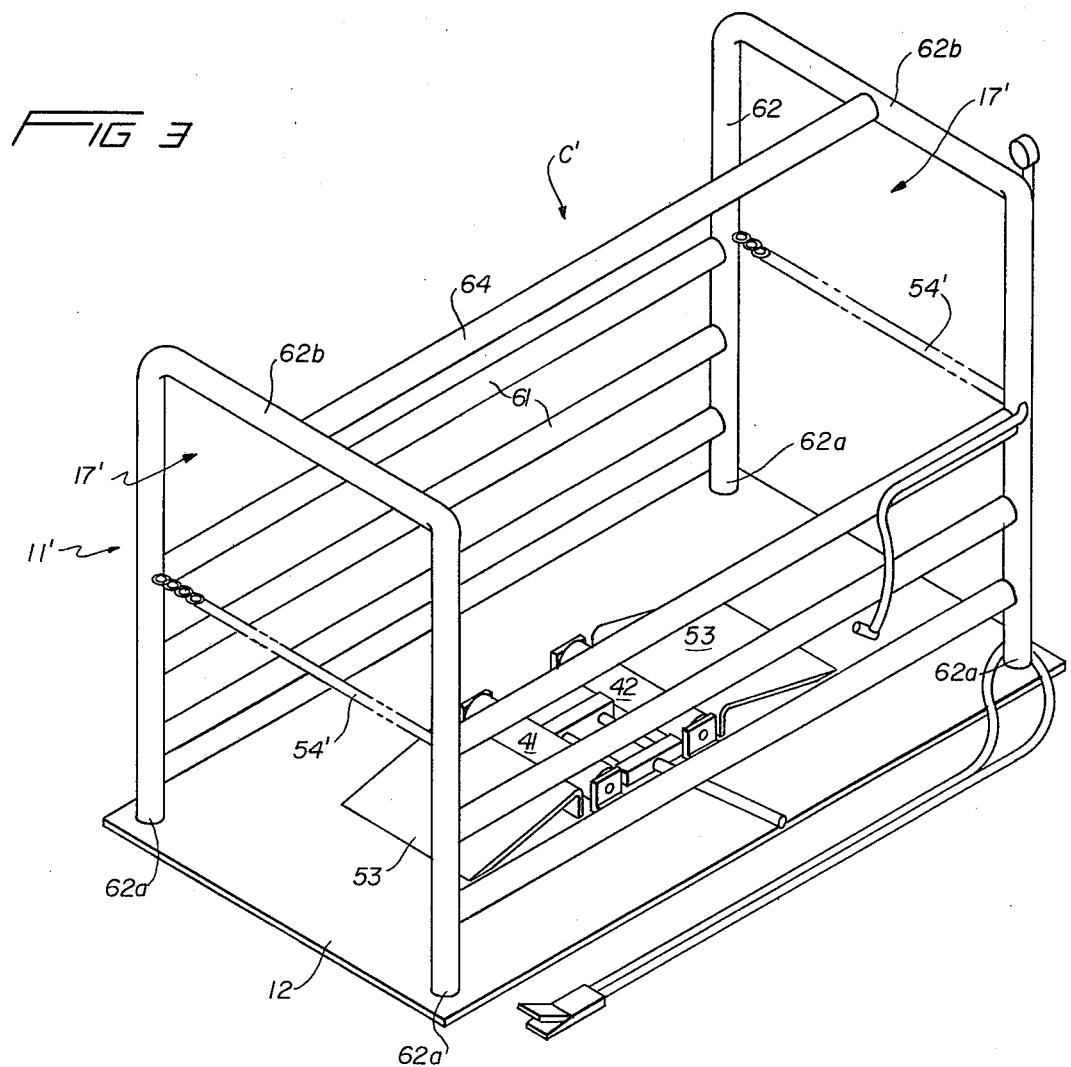
FIG. 3 is a perspective view of a second embodiment of the safety cage of the invention.

Referring now to FIG. 3, there is shown a second embodiment of the safety cage of the invention wherein like numerals are utilized to identify like parts. In the embodiment of FIG. 3, wherein the cage of the invention is identified by the letter C', each end of the framework 11' is open to provide end openings 17' across which is provided restraining members such as chains 54'. The side members in the embodiment of FIG. 3, identified by the reference numeral 61, extend longitudinally and substantially parallel to the base plate 12. The side members 61 are connected at opposite ends to upstanding frame members 62 which are of inverted U-shaped configuration having free ends 62a suitably secured by welding or the like to the upper surface of the base plate 12. As in the embodiment of FIG. 1, the side members 61 are arranged in substantially parallel, spaced-apart relationship with the upper side members 61 defining open areas 63 opening laterally on opposite sides of the framework 11'. As the tire T to be inflated may be moved into and out of the interior of the enclosure formed by the framework 11' at either ends, two ramps 53 are suitably mounted on the upper surface of the base plate 12 each of the ramps 53 extending between one of the rollers 41, 42 and the adjacent open end 17' of the framework 11'. As will be noted, the framework 11' also includes a longitudinally extending frame member 64 at the upper portion of the framework 11' having opposite ends connected by welding or the like to the bight portions 62b of the frame members 62.

Figure 4:
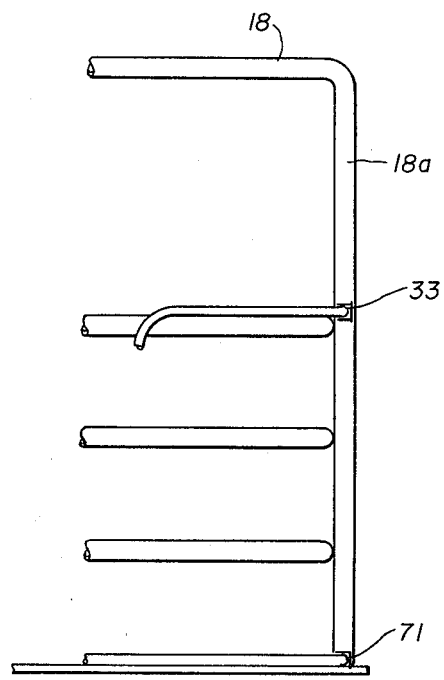
FIG. 4 is a perspective view of a portion of the safety cage in FIG. 1 showing a modification thereof.

Referring now to FIG. 4, there is shown a modification of the embodiment of FIG. 1 wherein a portion of the conduit section 27 has been eliminated and the hollow interior of the L-shaped frame member 18 and, in particular, the vertically extending section 18a is utilized. Thus, the end of the second conduit section 27 opposite the foot operated valve 24 is connected by means of a suitable fitting 71 to the interior of the frame member vertical section 18a. The interior of the frame member vertical section 18a communicates with the third conduit section 31 by means of the fitting 33 mounted in any well known manner on the frame member section 18a for connection to the hose 31.

Referring now to the embodiment of FIG. 5, wherein like numerals are utilized to identify like parts there is shown a third embodiment of the safety cage of the invention which is identified by the letter C''. In the embodiment of FIG. 5, the side members 72 are disposed in an angular relationship with the base plate 12 and are arranged in substantially parallel spaced-apart relationship as in the first and second embodiments to form a framework 70. The side members 72 in the embodiment of FIG. 5 are of U-shaped configuration being formed of pipe or the like having free ends 72a secured by suitable means such as welding or the like to the upper surface of the base plate 12. The bight portion 72b of the side members 72 are interconnected by suitable supporting means such as a bracket 73. In the embodiment of FIG. 5, a tire T disposed within the framework 70 has an upper and lower circumferential portion extending within the open areas 90 degrees tangent to the side member 72 i.e., the side members 72 on the left as viewed in FIG. 5. It can be seen that with the arrangement of the side members 72 in FIG. 5, the framework 70 is open at each end to provide open ends 76, 77 which permit a tire T on a wheel W to be moved within the interior of the framework 70 from either end of the cage C''. Accordingly, a pair of ramps 53 are provided adjacent the rollers 41, 42 to facilitate the movement of the tire T onto the rollers 41, 42 through either open end 76, 77.

Figure 6:
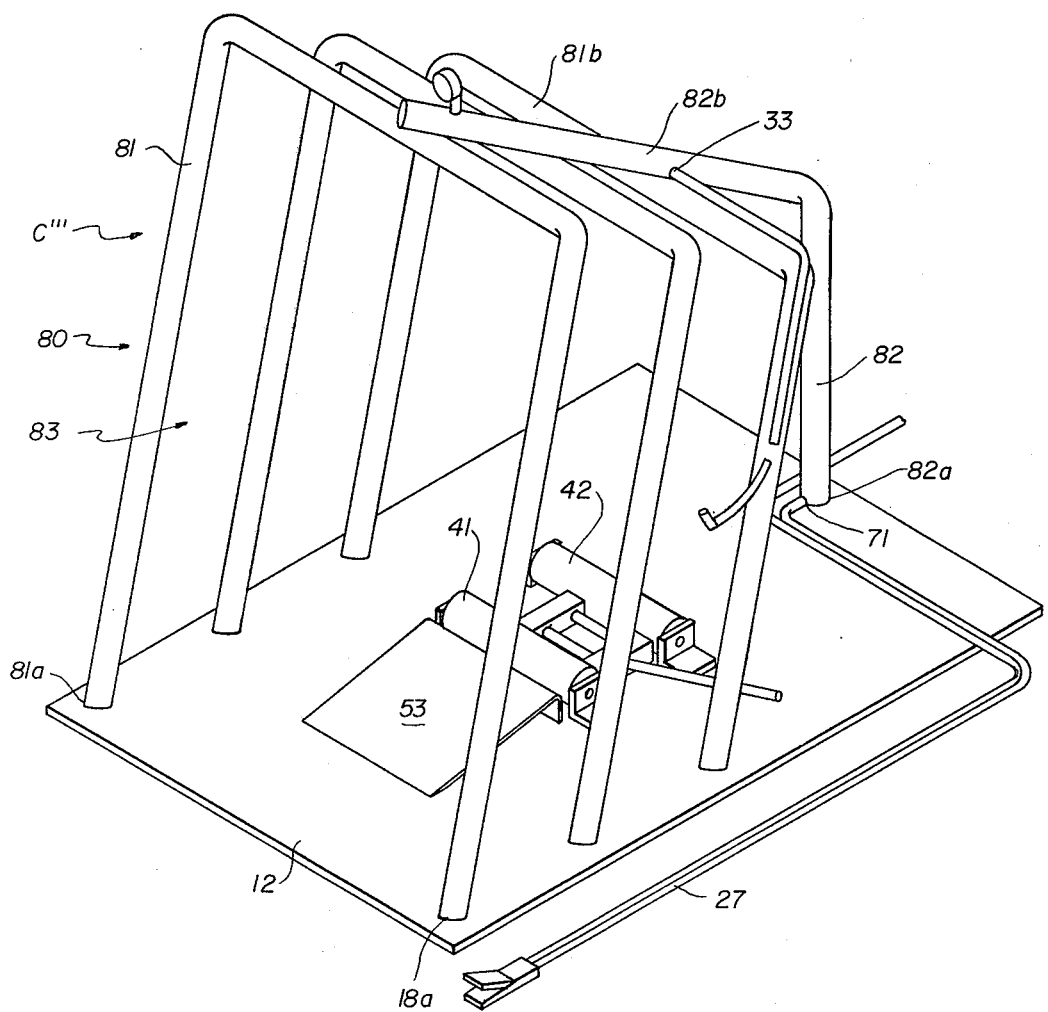
FIG. 6 is a perspective view of a fourth embodiment of the safety cage of the invention.

In the embodiment of FIG. 6, which is similar to the embodiment of FIG. 5 and wherein like numerals are utilized to identify like parts, the cage C''' includes a framework 80 having side members 81 of U-shaped configuration with free ends 81a suitably secured by welding or the like to the base plate 12. As in the embodiment of FIG. 5, the side members 81 are disposed in angular relationship with the base plate 12 and the means for supporting the side members 81 in spaced-apart, parallel relationship include an upstanding frame member 82 having a bottom end 82a secured by welding or the like to the upper surface of the base plate 12 and an angularly extending upper end portion 82b secured by welding or the like to the bight portions 81b of the side members 81. Thus, only a single open end 83 is provided in the cage C''' of FIG. 6 and therefore only a single ramp 53 adjacent this open end 83 for moving the tire T onto and off the rollers 41, 42. It will be noted in the embodiment of FIG. 6 that a portion of the conduit section 27 of the embodiment of FIG. 1 is omitted and the frame member 82 substituted therefor for communicating with the remaining portion of the conduit section 27 through the fitting 71 with the interior of the frame member or pipe 82. As in the embodiment of FIG. 4, the third conduit section 31 is connected in communication with the interior of the pipe 82 by means of the fitting 33.

In the use of the safety cage of the invention, and in any of the embodiments, the repaired tire to be inflated is rolled up the ramp 53 through either of the open ends of the framework into a position within the interior of the framework such as the framework 11 in the cage C of FIG. 1. The hose section 31 is then connected to the tire valve 22 and by depressing the pedal 26 of the foot operated valve 24, pressurized air is admitted into the tire T for inflation from the associated source of pressurized air. During the inflation of the tire T, the tire T may be manually rotated on the rollers 41, 42 during which the operator wielding a hammer may swing the hammer in a normal lateral fashion onto portions of the lock ring R which may not be seated. The longitudinally extending side members such as the side members 14 in the embodiment of FIG. 1 permit such striking of the lock ring R in an easy and natural manner. When inflation of the tire is completed, lever 51 is depressed to elevate the plate member 46 whereupon the tire T is